Figure 5:
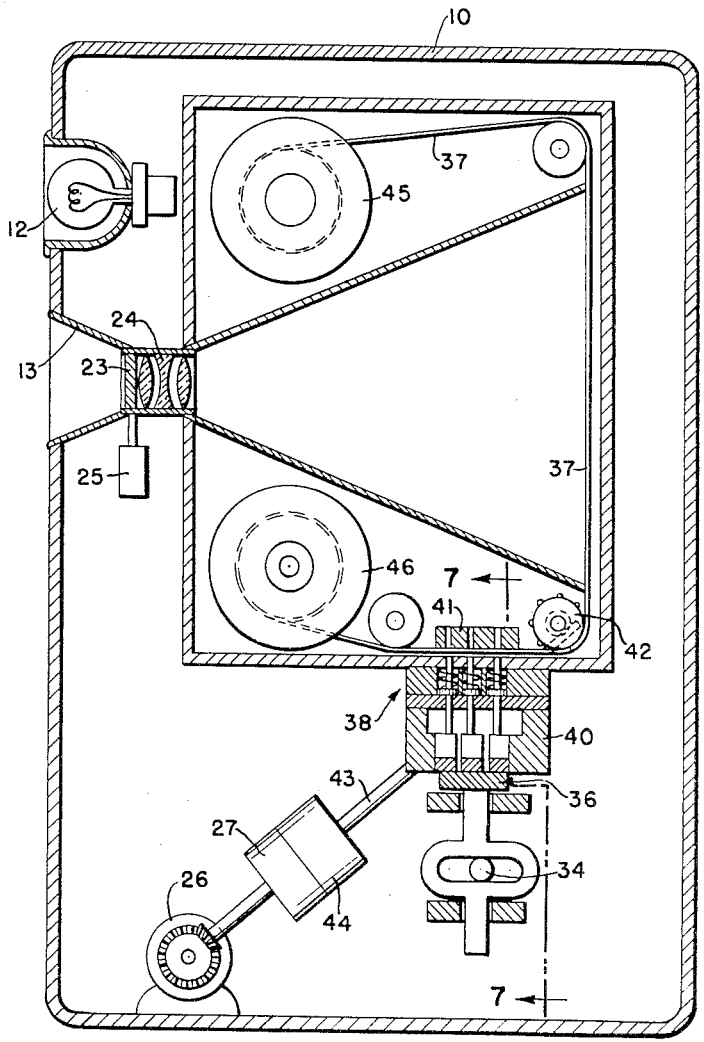

March 6, 1956  L. G. SIMJIAN  2,737,095
CAMERA
Filed Nov. 30, 1954  3 Sheets-Sheet 1
FIG. 1
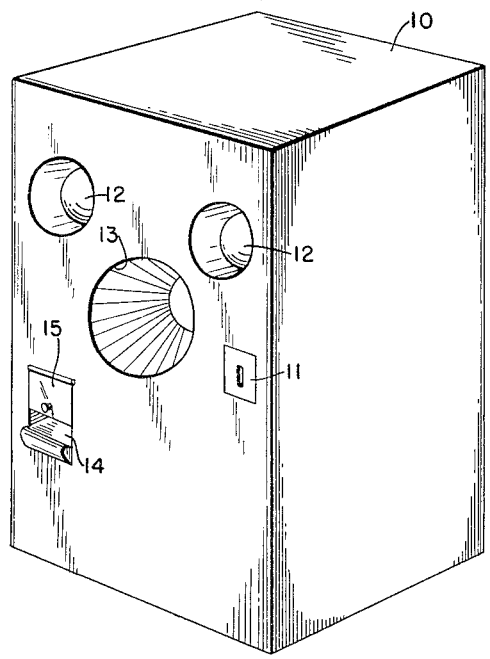
FIG. 2
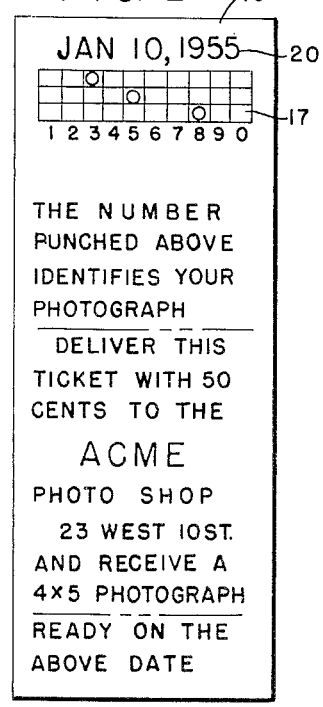
FIG. 3
| | |
|---|---|
| LIGHTS | ON / OFF |
| LENS SHUTTER | OPEN / CLOSED |
| MOTORS | ON / OFF |
| FILM CLUTCH | ENGAGED |
| PUNCH CLUTCH | ENGAGED |
| PICKER KNIFE | |
| DATE STAMP | |
FIG. 4
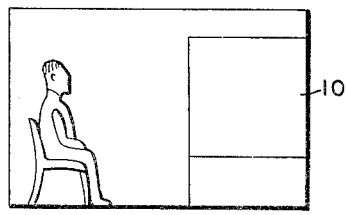
LUTHER G. SIMJIAN
INVENTOR.
BY Ralph E. Bitner
ATTORNEY.

March 6, 1956     L. G. SIMJIAN     2,737,095

CAMERA

Filed Nov. 30, 1954     3 Sheets-Sheet 2

LUTHER G. SIMJIAN
INVENTOR.

BY Ralph E. Bitner
ATTORNEY.

March 6, 1956  L. G. SIMJIAN  2,737,095
CAMERA

Filed Nov. 30, 1954  3 Sheets-Sheet 3

LUTHER G. SIMJIAN
INVENTOR.

BY Ralph E. Bitner

ATTORNEY.

United States Patent Office 2,737,095
Patented Mar. 6, 1956

2,737,095
CAMERA
Luther G. Simjian, Greenwich, Conn.
Application November 30, 1954, Serial No. 472,062
8 Claims. (Cl. 95—1.1)

This invention relates to a camera which includes automatic operating features and has particular reference to the identification of a camera film by means of identifying data on the camera film and on a ticket which is made available each time a picture is taken.

Many types of automatic cameras have been developed and marketed. Some are fully automatic since they take a picture, develop and fix a photograph, and then deliver it to the purchaser. While such cameras are convenient and fast, the pictures they produce are generally moist and not of high quality. In addition, only rarely a photographic film is employed for preserving a directly reproducible record. The present invention overcomes many of these difficulties. A picture is taken on a film which can be used to make many prints. At the same time a ticket and the film are both provided with identifying marks and the ticket is issued to the purchaser. The purchaser later receives one or more enlarged photographic prints by presenting the ticket to a photographic laboratory. Because the film is developed in a laboratory and enlargements are made under controlled laboratory conditions, the resulting prints can possess the high quality usually found in studio portraits.

One of the objects of this invention is to provide an improved camera which avoids one or more of the disadvantages and limitations of prior art arrangements.

Another object of the invention is to provide a simplified camera which can be used by the public to take portraits.

Another object of the invention is to provide a camera having many automatic features but which does not employ liquids for its operation.

Still another object of the invention is the provision of a photographic negative which is available to skilled laboratory personnel for rendering the best possible print.

Another object of the invention is to insure positive identification of a film by mechanically marking both the film and a ticket with identifying data.

Another object of the invention is to simplify and improve the operation of coin operated cameras by issuing an identifying ticket immediately after a picture has been taken.

The invention comprises a coin operated camera which includes a lens and a support for a sensitized photographic film. At one side of the camera box a system of identification is mounted for identifying the film immediately after the picture is taken. A similar system which is controlled by the same mechanical means which controls the film identifying system is mounted so as to identify the ticket to correspond with the film. After the picture has been taken and the identifying data added to both the film and ticket, the film is wound on a roll in a storage chamber and the ticket is stamped with a date and delivered to the person whose picture has been taken.

For a better understanding of the present invention, together with other and further objects thereof, reference is made to the following description taken in connection with the accompanying drawings.

Figure 6:
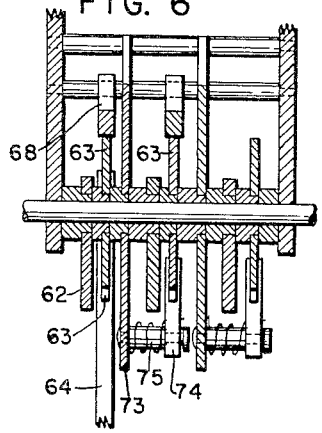
Figure 7:
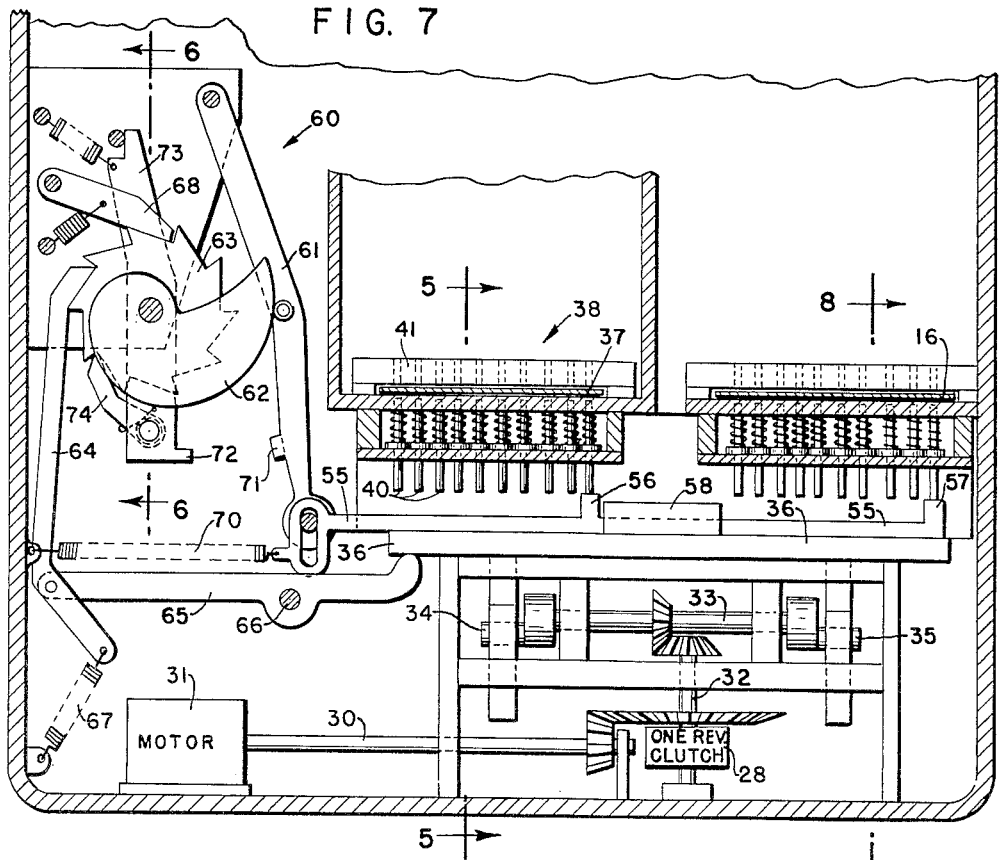
Figure 8:
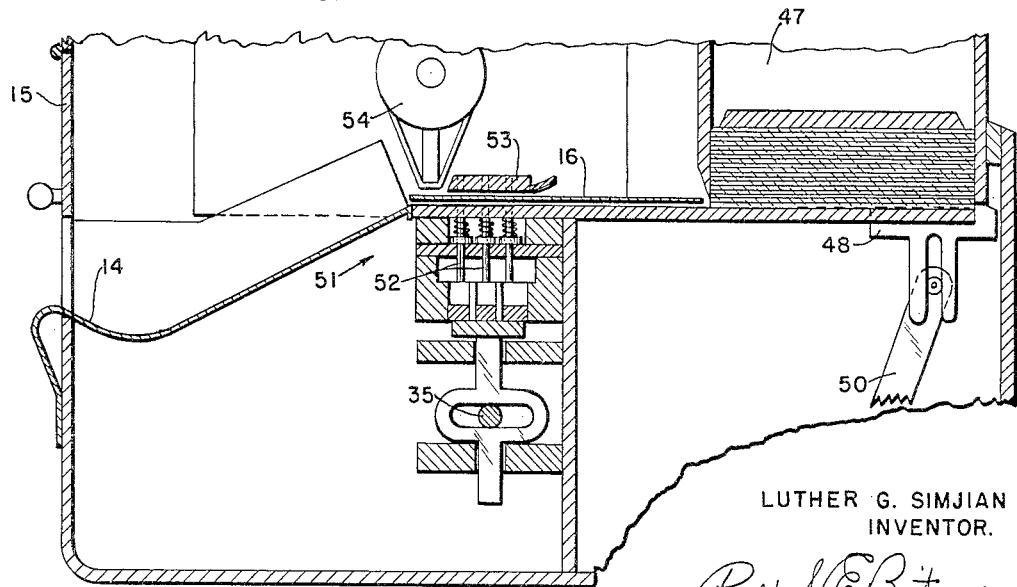

Fig. 1 is a perspective view of the camera.
Fig. 2 is a plan view of the ticket issued by the machine.
Fig. 3 is a timing diagram illustrating the operation of the various machine components.
Fig. 4 is a side view indicating the position taken by a user of the machine.
Fig. 5 is a cross sectional view of the camera and shows in schematic form a film punch and other essential components of the camera.
Fig. 6 is a sectional view of the counting mechanism shown in Fig. 7 and is taken along line 6—6 of that figure.
Fig. 7 is a cross sectional view of the lower part of the camera case and shows both the film punch and the ticket punch.
Fig. 8 is a cross sectional view taken along line 8—8 of Fig. 7 and illustrates the details of the ticket storage and ticket punching mechanisms.

Referring now to the figures, a camera box 10 contains all of the necessary components for the operation which includes taking a picture and issuing an identifying ticket. The camera is generally operated by a coin mechanism but this not necessary when it is desired to have an operator in attendance. Fig. 1 shows a coin slot 11 for receiving a coin. The coin operating mechanism is not shown in the drawings since these devices are old in the art and have been well developed. The camera also contains two or more lamps 12 which may be lighted just prior to taking a picture. A lens aperture 13 is positioned adjacent to the lamps for admitting light to the camera lens. Just below the lens aperture is a compartment 14 for issuing a ticket which bears a series of identifying markings corresponding to similar markings on the film. Above compartment 14 is a door 15 which can be opened by an operator in order to change the date which is stamped on the ticket.

The details of ticket 16 are shown in Fig. 2 and include an identifying area 17 adapted to receive markings for identifying the ticket with the film. As will be indicated later, there are numerous ways of applying mechanical identifying markings to the film and the ticket. The following description relates to punched holes, sequentially varied, but the invention is not limited to this type of data. A system of numbers and marked-off areas as shown in Fig. 2, can be used for rapid reading of the number but this is not necessary. The tickets may be part of a continuous strip stored in a roll and cut into separate tickets just before being issued, or they may be precut and stored in a vertical storage chamber. After the number has been punched, a date 20 is stamped on the ticket and the ticket is delivered to compartment 14 where it is available to the operator of the machine. The ticket is made large enough so that it may also contain detailed instructions for obtaining the finished photograph.

Fig. 3 indicates in a general manner the sequential operation of the camera mechanism. The machine is started by an operator or by the coin mechanism. Shortly after the initial actuation the lights are turned on and a short time interval after that a lens shutter 23 in front of lens 24 is operated by an electromagnetic device 25. At the same time the shutter is opened, or slightly before, a motor 26, positioned at the base of the machine, starts running but does not cause the actuation of any camera component because two clutches 27 (Fig. 5) and 28 (Fig. 7) are initially disengaged. As indicated by the timing diagram, the motors continue to run until the end of the operating cycle.

Operation of the lens shutter 23 completes the picture taking cycle and the remainder of the camera operation includes punching the identifying holes in the film and ticket, moving a portion of the unexposed film into the camera focal plane for the next picture, stamping the ticket with a date, and issuing the ticket to compartment 14. Punch clutch 28 is engaged by electromagnetic means and couples driver shaft 30 and motor 31 to shaft 32 which turns cross shaft 33 and two eccentric stub shafts 34 and 35. These stub shafts operate within the slot of a scotch yoke and causes a table 36 to be raised to complete two punching operations. Details of a camera-operating mechanism which could be applied to the above described components may be found in U. S. patent aplication, Serial No. 330,444, filed January 9, 1953, now issued as Patent 2,699,100, also application Serial No. 396,798, filed December 8, 1953; and application Serial No. 351,183, filed April 27, 1953, all by L. G. Simjian.

Details of the punch chambers are shown in Figs. 5, 7, and 8. The film punch chamber 38 includes ten punches 40 and a perforated plate 41 into which the punches are forced by table 36. The film 37 is fed between the punches and the perforated plate by a sprocket gear 42 (Fig. 5) turned by shaft 43 which is coupled to clutch 27 and motor 26. In order to provide the right amount of film rewound after each exposure a gear box 44 may be mounted adjacent to clutch 27. Film 37 is wound from a storage spool 45 and is wound onto a second storage spool 46.

The tickets 16 are stored in a vertical compartment 47 and are moved from the base of this compartment, one at a time, by a picker knife 48 operated by lever 50. The first operation of the picker knife is to move a single ticket from the bottom of the storage compartment to the position shown in Fig. 8 where its identifying number is punched by a punch arrangement 51, which includes punch shafts 52 and a perforated plate 53 which contains holes into which the punch ends penetrate during the punching operation. At the position shown in Fig. 8 the date is also stamped on the ticket by a date stamp 54, and at the conclusion of the punching and stamping operations the picker knife moves the ticket an additional amount so that it falls into compartment 14 and then the knife is retracted to its original position where it engages another ticket.

Picker knives and ticket storing compartments as described above are old in the art and have been disclosed in detail in many publications. U. S. Patent No. 2,214,029 issued September 10, 1940, to H. P. Mixer described such a ticket storing and punching means with the tickets actuated by a picker knife and power rollers (see Figs. 4 and 6).

The punches 40 are arranged in three banks of ten punches in each bank, only one bank of each of the punch arrangements being shown in Fig. 7. The punches are engaged by an interponent 55 containing two raised portions 56 and 57 which make contact with the lower ends of the punches. The three interponents 55 are held in place by a sleeve 58 secured to table 36. The interponents are positioned by a counting arrangement 60 shown in Fig. 7 which advances by a count of one after each punching operation and positions the interponents 55 so that sequential numbers are indicated by the punched holes in each succeeding ticket. The interponents are engaged by a lever 61 which in turn is controlled by a snail cam 62 operated by a ratchet wheel 63. An operating pawl 64 engages the teeth of ratchet 63 and moves it one tooth or one-tenth of a revolution each time the punch is operated. Pawl 64 is pivoted to an operating lever 65 which is mounted on a shaft 66 so that one end engages the power portion of table 36. When table 36 is raised spring 67 lowers the left side of lever 65 and pulls down pawl 64 so that it engages the next tooth in wheel 63. When table 36 is lowered to its normal position pawl 64 is raised, turning wheel 63 and snail cam 62 to move lever 61 to a new position, thereby moving one of the interponents 55 to a new position to represent the next sequential number. Ratchet wheel 63 is retained in its operating position by a retaining pawl 68. After a count of nine has been reached in the units denominational order the next movement of snail cam 62 permits the cam follower on lever 61 to fall to the left as shown in Fig. 7 under the action of spring 70 and move interponent 55 so that raised portions 56 and 57 are again under the first or zero indicating punches 40. When the above described operation occurs a portion 71 of lever 61 makes contact with the lower end 72 of a carry lever 73 moving this lever in a clockwise direction as seen in Fig. 7 and moving ratchet wheel 63 in the next higher denominational order one tooth because of the engagement by carry pawl 74. Fig. 6 shows all three denominational orders and indicates the manner in which carry pawl 74 is mounted on a stub shaft 75 to control the ratchet gear in the next order. In a similar manner the counting arrangement which positions the tens interponent 55 operates after a ninety-nine count to move the hundreds order ratchet wheel one space to record a count of one hundred.

The operation of the complete machine can be understood by referring to the timing diagram shown in Fig. 2. As soon as the coin starts the operation, lights 12 and motors 26 and 31 are turned on. Also during this starting period picker knife 48 moves a ticket from the bottom of chamber 48 into the ticket punch chamber 51 to the position indicated in Fig. 8. During the time the ticket is being positioned the lens shutter opens and closes exposing film 37 at the back of the camera. Immediately after the exposure has been made clutch 28 is engaged and table 36 moves up and down to punch identifying holes in both the film and the ticket. Sometime during the operation of the two punches the date stamp 54 is lowered to print a date on the upper end of the ticket. After the punching operation the picker knife 48 continues its motion toward the front of the machine thereby ejecting the ticket and at the same time film clutch 27 is energized to turn shaft 43 and sprocket wheel 42 to move the film so that new unexposed portion is in the punch 38 and at the rear of the camera. In order to take up the film, spool 46 is supplied with the usual friction type belt which keeps the tension on the film at all times. As soon as the ticket has been ejected into compartment 14 the picker knife 48 is retracted to its normal position at the rear of the machine.

The machine described above may be employed to produce identifying data other than punched holes. The same counting mechanism and the same system of interponents may be employed to operate a plurality of styli to mark both the film and the ticket by a scratching or embossing operation. Also, a system of printing numbers on the ticket and film may be used by installing a number printer having sequentially changing digit printing rings. These numbering machines are old in the art and are in common use.

The counting and interponent mechanisms may also be used to operate small dot printing rods instead of the punch units 40. These rods can cooperate with an ink pad or have an ink supply built into the center of the rod and function in a manner similar to a fountain brush. In all the above described alternative methods of putting identifying marks on both the film and the ticket it is important to control the identifying mechanism so as to put the same data on ticket and film and to vary the data, sequentially or otherwise, for succeeding ticket-film combinations.

While there has been described and illustrated a specific embodiment of the invention, it will be obvious that various changes and modifications may be made therein without departing from the field of the invention which should be limited only by the scope of the appended claims.

I claim:

1. A photographic apparatus in combination with ticket identifying and ticket dispensing means comprising, a camera for photographically recording on a sensitized film the image of an object disposed in front of the camera, means for mechanically recording identifying data on the film and on a dispensable ticket, a ticket storing means operatively connected to said camera, and means for dispensing the identified ticket to a position exterior of the apparatus in response to an exposure actuating operation.

2. A photographic apparatus in combination with ticket identifying and ticket dispensing means comprising, a camera for photographically recording on a sensitized film in a focal plane the image of an object disposed in front of the camera, means for illuminating the object, means for mechanically recording identifying data on the film and on a dispensable ticket, a ticket storing means operatively connected to said camera, and means for dispensing the identified ticket to a position exterior of the apparatus in response to an exposure actuating operation.

3. A photographic apparatus in combination with ticket identifying and ticket dispensing means comprising, a camera for photographically recording on a sensitized film in a focal plane the image of an object disposed in front of the camera, means for illuminating the object, means for mechanically recording identifying data on the film and on a dispensable ticket, a ticket storing means operatively connected to said camera, means for dispensing the identified ticket to a position exterior of the apparatus in response to an exposure actuating operation and means which vary the identifying markings in a predetermined sequence.

4. A photographic apparatus in combination with ticket identifying and ticket dispensing means comprising, a camera for photographically recording on a sensitized film in a focal plane the image of an object disposed in front of the camera, means for illuminating the object, means for mechanically recording identifying data on the film and on a dispensable ticket, a ticket storing means operatively connected to said camera, means for dispensing the identified ticket to a position exterior of the apparatus in response to an exposure actuating operation, and means for moving a second ticket and the film to a position where an unexposed portion of the film and the second ticket are in a position for receiving said identifying data.

5. A photographic apparatus in combination with ticket identifying and ticket dispensing means comprising; a camera for photographically recording on a sensitized film in a focal plane the image of an object disposed in front of the camera, said camera including a lens and a shutter; a plurality of tickets stored within the apparatus; means for mechanically recording identifying data on the film and on one of said tickets, and ticket translating means which moves a ticket from a storage compartment to a position where the identifying data may be recorded and then dispenses the ticket to a position exterior of the apparatus in response to an exposure actuating operation.

6. A photographic apparatus in combination with ticket identifying and ticket dispensing means comprising, a camera for photographically recording on a sensitized film in a focal plane the image of an object disposed in front of the camera, said camera including a lens and a shutter; a plurality of tickets stored within the apparatus; means controlled by an operator for opening said shutter to expose the film and for mechanically recording identifying data on the film and on one of said tickets, means for moving the exposed film to a storage chamber and for moving an unidentified ticket into a position where the identifying data may be recorded, and means for dispensing the identified ticket to a position exterior of the apparatus in response to said operator controlled means.

7. A photographic apparatus in combination with ticket identifying and ticket dispensing means comprising, a camera for photographically recording on a sensitized film in a focal plane the image of an object disposed in front of the camera, means for illuminating the object, means for mechanically recording identifying data on the film and on a dispensable ticket, a ticket storing means operatively connected to said camera, means for moving a ticket from said storing means to a position where identifying data may be recorded and where a date may be stamped thereon, and means for dispensing the identified ticket to a position exterior of the apparatus in response to an exposure actuating operation.

8. A photographic apparatus in combination with ticket punching and ticket dispensing means comprising, a camera for photographically recording on a sensitized film in a focal plane the image of an object disposed in front of the camera, means for illuminating the object, means for punching identifying data holes in the film adjacent to said recorded image and for punching identifying data holes in a dispensable ticket, a ticket storing means operatively connected to said camera, means for moving a ticket from said storing means to a data punching chamber, and means for dispensing the punched ticket to a position exterior of the apparatus in response to an exposure actuating operation.

No references cited.